United States Patent
Nakagawa

(10) Patent No.: US 12,361,094 B2
(45) Date of Patent: Jul. 15, 2025

(54) TRAINING DATA GENERATION DEVICE AND TRAINING DATA GENERATION PROGRAM

(71) Applicant: SYSTEM SQUARE INC., Nagaoka (JP)

(72) Inventor: Sachihiro Nakagawa, Nagaoka (JP)

(73) Assignee: SYSTEM SQUARE INC., Niigata (JP)

( * ) Notice: Subject to any disclaimer, the term of this patent is extended or adjusted under 35 U.S.C. 154(b) by 913 days.

(21) Appl. No.: 17/281,228

(22) PCT Filed: Sep. 20, 2019

(86) PCT No.: PCT/JP2019/037047
§ 371 (c)(1),
(2) Date: Nov. 7, 2021

(87) PCT Pub. No.: WO2020/071162
PCT Pub. Date: Apr. 9, 2020

(65) Prior Publication Data
US 2022/0067434 A1    Mar. 3, 2022

(30) Foreign Application Priority Data
Oct. 1, 2018    (JP) .................................. 2018-186778

(51) Int. Cl.
*G01N 23/04*     (2018.01)
*G06F 18/214*    (2023.01)
(Continued)

(52) U.S. Cl.
CPC ........... *G06F 18/214* (2023.01); *G06N 20/00* (2019.01); *G06T 7/001* (2013.01); *G06T 2207/10116* (2013.01)

(58) Field of Classification Search
CPC ....... G06F 18/214; G06N 20/00; G06T 7/001; G06T 2207/10116; G06T 2200/24;
(Continued)

(56) References Cited

U.S. PATENT DOCUMENTS

2003/0212544 A1    11/2003  Acero et al.
2018/0107928 A1     4/2018  Zhang et al.

FOREIGN PATENT DOCUMENTS

JP     201189920 A    5/2011
JP     5133782 B2 *   1/2013
(Continued)

OTHER PUBLICATIONS

Watanabe Toshiya, Inspection Device, Inspection Method and Program, machine translation of Japan patent publication No. 2014153906 (Year: 2014).*

(Continued)

*Primary Examiner* — Vu Le
*Assistant Examiner* — Lei Zhao
(74) *Attorney, Agent, or Firm* — HAUPTMAN HAM, LLP

(57) ABSTRACT

A training data generation device generates training data usable in machine learning. A learned model using the training data generated by the training data generation device is used in an inspection device for determining whether an inspection target is a normal product by inputting an image capturing the inspection target into the learned model. The training data generation device includes: a determination-target image extraction unit that extracts, from an input image, one or more determination-target images containing a determination target that satisfies a predetermined condition; a sorting unit that associates, on the basis of sorting the inspection target captured in the determination-target image, each of the determination-target (Continued)

images and a result of the sorting with each other; and a training data memory unit that stores training data in which each of the determination-target images and a result of the sorting are associated with each other.

5 Claims, 10 Drawing Sheets

(51) Int. Cl.
*G06N 20/00* (2019.01)
*G06T 7/00* (2017.01)

(58) Field of Classification Search
CPC .......... G06T 2207/20081; G06T 2207/30108; G01N 2021/8883; G01N 2021/8887; G01N 21/8851; G01N 2223/305; G01N 2223/401; G01N 2223/643; G01N 2223/646; G01N 23/04
See application file for complete search history.

(56) References Cited

FOREIGN PATENT DOCUMENTS

| JP | 2014153906 A | 8/2014 |
|----|--------------|--------|
| JP | 20185639 A | 1/2018 |

OTHER PUBLICATIONS

Ando Hidetoshi, Inspection Device, Image Classification Device, Image Inspection Device, a ND Program, machine translation of Japan patent publication No. 2018005639 (Year: 2018).*
Morstadt, How do CCDs work?, https://www.astronomy.com/observing/how-do-ccds-work/, Nov. 25, 2013 (Year: 2013).*
International Search Report in PCT Application No. PCT/JP2019/037047, mailed Dec. 10, 2019, 6pp.
Written Opinion in PCT Application No. PCT/JP2019/037047, mailed Dec. 10, 2019, 17pp.
Extended European Search Report in 19868890.5, mailed Jun. 15, 2022, 9pp.

* cited by examiner

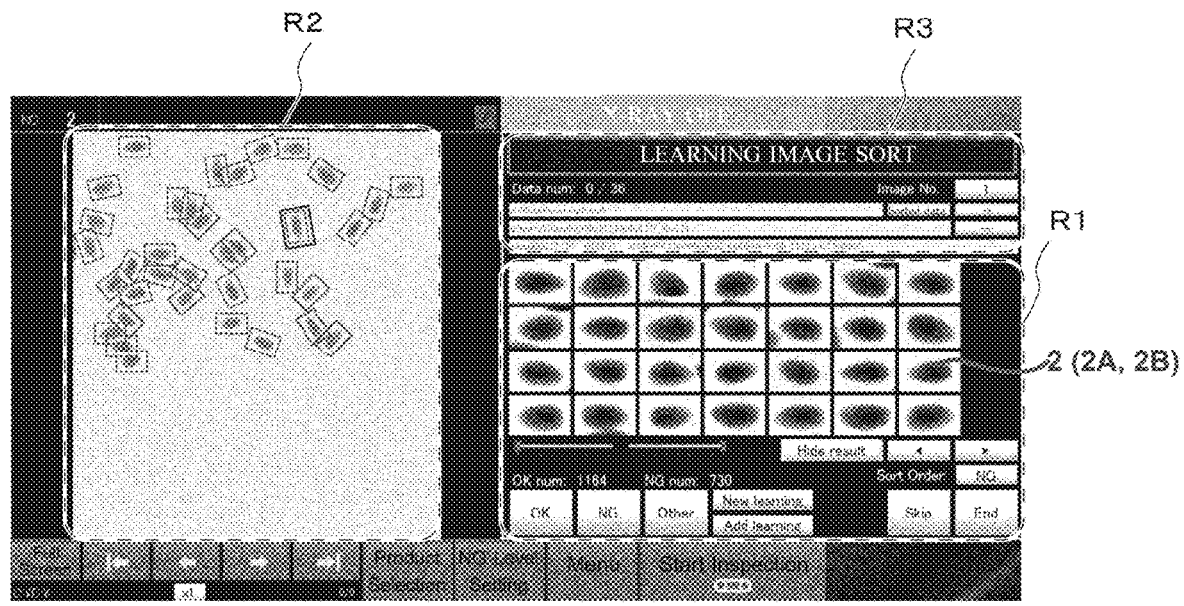
Fig.8
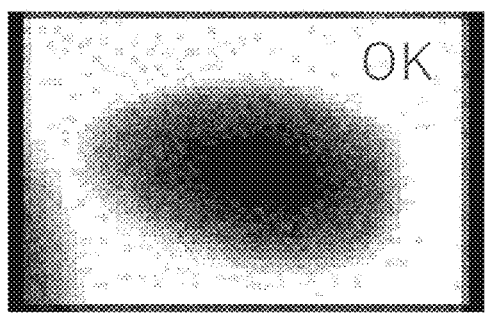 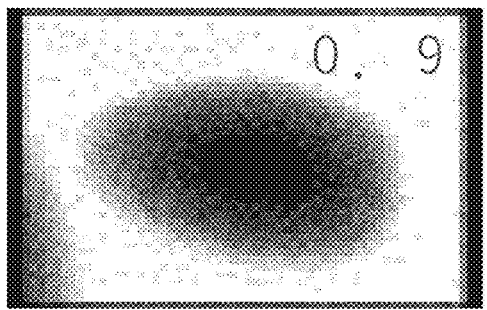
Fig. 9A                    Fig. 9B

Fig.10A

LEARNING IMAGE SORT
Data num: 0 / 36    OK    Image No.  1 3

Fig.10B

LEARNING IMAGE SORT
Data num: 0 / 36    0. 9    Image No.  1 3

TRAINING DATA GENERATION DEVICE AND TRAINING DATA GENERATION PROGRAM

RELATED APPLICATIONS

The present application is a National Phase of International Application No. PCT/JP2019/037047, filed Sep. 20, 2019, and claims priority based on Japanese Patent Application No. 2018-186778, filed Oct. 1, 2018.

FIELD OF THE INVENTION

The present invention relates to training data generation devices for generating training data in inspection devices for inspecting inspection targets on the basis of images capturing the inspection targets. The training data generation devices are subject to machine learning to generate a learned model for determining non-defective and/or defective status of the inspection targets.

BACKGROUND ART

An X-ray inspection device includes an X-ray generation unit and an X-ray detection unit that are arranged facing each other. Inspection targets are sequentially fed through between these units by a feeding device such as a conveyer. X-ray transmission data is obtained when the inspection targets pass through between the X-ray generation unit and the X-ray detection unit. By using the X-ray transmission data, the X-ray inspection device constructs an X-ray transmission image of the inspection targets and performs a non-destructive inspection on the inspection targets using such X-ray transmission image. Examples of its applications include inspections for checking whether the contents of packaged products are contaminated with foreign matter, inspections for checking whether the contents are equipped with a predetermined number of pieces, inspections for checking whether defects, such as cracks, exist in the contents, and the like. These inspections are performed on various items including foodstuffs, pharmaceuticals, industrial components, and the like. In addition to X-ray inspection devices, other inspection devices have also been put to practical use for inspecting inspection targets on the basis of images capturing the inspection targets.

In this type of inspection device, the inspection targets are sorted into non-defective items and defective items based on predetermined determination criteria. These criteria have conventionally been pre-defined; however, owing to the current development of machine learning technology, the use of learned models for the determination criteria has been proposed. The learned models are generated by inputting training data (learning data) into learning programs (see, for example, Patent Document 1).

PRIOR ART DOCUMENTS

Patent Documents

Patent Document 1: Japanese Patent Application No. 2011-089920

SUMMARY OF THE INVENTION

Problems to be Solved by the Invention

A learned model is capable of improving determination accuracy by repeatedly learning a large amount of input training data. However, it has not been easy to prepare a large amount of training data in an efficient way. In particular, when images are used as training data, substantial effort is required to prepare a multitude of images associated with pass/fail determination results while adjusting the conditions for the images (for example, size, contrast, etc.).

The present invention has been made in view of the above-described problem, and an object of the present invention is to provide a training data generation device that is enabled to rapidly generate a large amount of training data to be input into a learning program.

Means for Solving the Problem

The training data generation device of the present invention generates training data to be used in machine learning. A learned model generated by the machine learning using the training data generated by the training data generation device is used in an inspection device that performs inspection for determining whether or not an inspection target is a normal product by inputting an image capturing the inspection target into the learned model. The training data generation device includes the following: a determination-target image extraction unit that extracts, from an input image capturing the inspection target, one or more determination-target images containing a determination target that satisfies a predetermined condition; a sorting unit that associates, on the basis of a sorting operation of sorting the inspection target captured in the determination-target image into either a normal product or a non-normal product, each of the determination-target images and a result of the sorting with each other; and a training data memory unit that stores training data in which each of the determination-target images and a result of the sorting are associated with each other.

In the present invention, the determination-target image extraction unit may include the following: an image processing unit that performs image processing on the input image and outputs a processed image; a determination-target identification unit that identifies the determination target contained in the processed image on the basis of a predetermined determination condition; and an image cutting-out unit that cuts out and outputs, from the processed image, the determination-target image containing the determination target identified by the determination-target identification unit.

In the present invention, the image cutting-out unit may identify a minimum rectangle containing the determination target identified by the determination-target identification unit and output, as the determination-target image, an image obtained by scaling an image contained in the minimum rectangle to a predetermined size.

In the present invention, the determination-target image extraction unit may normalize the brightness of the determination-target image and output the determination-target image.

In the present invention, the training data generation device may further includes the following: a display; and a display control unit that controls display performed by the display. The display control unit may cause a first area of the display to display a plurality of the determination-target images in sequence and cause a second area of the display to display the input image with an indication of an area corresponding to the determination-target image being superimposed on the input image.

In the present invention, when one of the plurality of determination-target images displayed in the first area of the display is selected, the display control unit may cause an indication of an area corresponding to the selected determination-target image to be displayed in the input image displayed in the second area of the display.

A computer program according to the present invention may cause a computer to function as any of the training data generation devices described above.

BRIEF DESCRIPTION OF THE DRAWINGS

FIG. 8 is a diagram showing an exemplary screen displaying images of the determination target.

FIGS. 9A and 9B show display examples of information indicating determination results in areas for displaying images of the determination target.

FIGS. 10A and 10B show display examples of scores, determination results, etc. in areas for displaying information.

EMBODIMENTS OF THE INVENTION

Embodiments of the present invention will be described hereinafter with reference to the drawings. Identical members will be denoted by the same reference numbers and the description of already-described members will be omitted as necessary in the following description.
Configuration of Inspection Device 1

Figure 1:
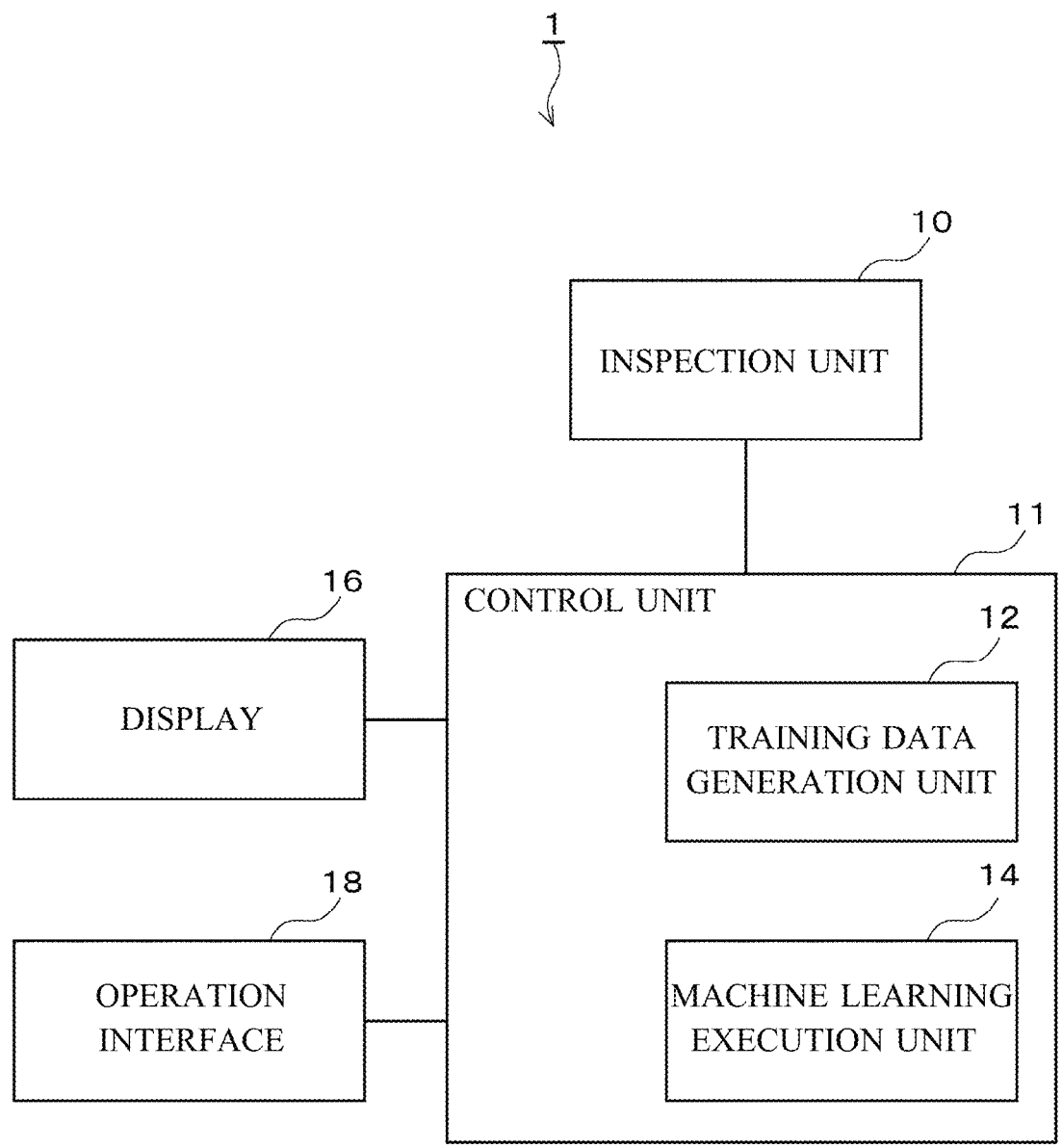
FIG. 1 is a block diagram showing a configuration of an inspection device 1.

FIG. 1 is a block diagram showing a configuration of the inspection device 1 that inspects whether or not an inspection target 2 is a normal product. The inspection device 1 includes an inspection unit 10, a control unit 11, a display 16 and an operation interface 18. The inspection targets 2 to be inspected by the inspection device 1 include, among normal products 2A, defective items (for example, products with chips, cracks, etc., products with abnormal relative mass and/or shape, products with biting at the sealing parts, and the like) and foreign matter (for example, pebbles, bones, and the like), which are to be removed. Hereinafter, these defective items, foreign matter, and the like, that are to be removed from the inspection targets 2 will be collectively referred to as objects to be removed 2B. The object to be removed 2B corresponds to a non-normal product in the present invention.

The inspection device 1 has an inspection mode and a learning mode. In the inspection mode, the inspection unit 10 captures an image of the inspection targets 2. A learned model generated by a machine learning execution unit 14 is applied to the image to perform an inspection for detecting an object to be removed 2B that is mixed into the inspection targets 2. In the inspection mode, the inspection device 1 analyzes the image capturing the inspection targets 2 to detect an object to be removed 2B that is mixed into the inspection targets 2. On the other hand, in the learning mode, training data is generated by a training data generation unit 12 on the basis of images of the inspection targets 2, which are captured with the inspection unit 10, or the like. The training data is input into the machine learning execution unit 14 and the learned model performs learning.

The inspection unit 10 captures an image of the inspection targets 2 and this image is required for performing inspection. An example of the inspection unit 10 is an X-ray inspection device for capturing an X-ray transmission image of the inspection targets 2; however, the inspection unit 10 is not limited thereto, as long as it is an inspection device that performs inspection on the basis of an image of the inspection targets 2. In the inspection mode, the inspection unit 10 applies the learned model that is previously generated by the machine learning execution unit 14 to the captured image of the inspection targets 2 to inspect the inspection targets 2. In addition, in the learning mode, the inspection unit 10 provides the captured image of the inspection targets 2 to the training data generation unit 12 as an input image.

Figure 2:
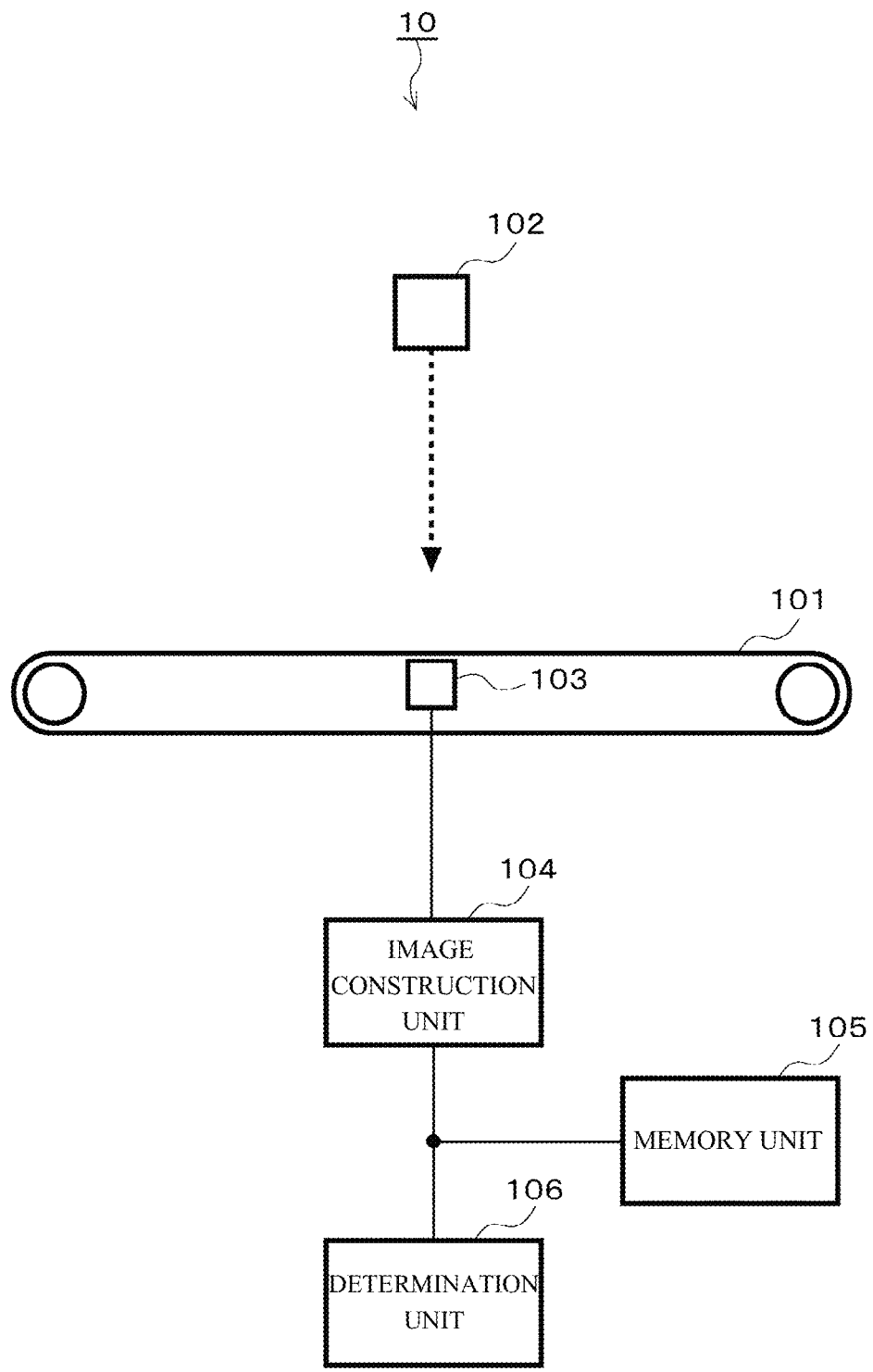
FIG. 2 is a diagram showing an exemplary configuration of an inspection unit 10.

FIG. 2 shows an exemplary configuration of the inspection unit 10. In this example, an X-ray transmission image is acquired as an image for inspection by radiating an X-ray as an electromagnetic wave. The inspection unit 10 includes a feed unit 101, a radiation unit 102 for radiating an electromagnetic wave, a detection unit 103 for detecting an electromagnetic wave, a construction unit 104 for constructing an image, a memory unit 105 and a determination unit 106.

The feed unit 101 is made up of one or more conveyor belts and feeds the inspection targets 2 to an inspection area, where images are captured, and feeds out the inspection targets 2 from the inspection area. The electromagnetic-wave radiation unit 102 radiates the inspection area with electromagnetic waves (for example, X-rays, visible light, etc.) required for capturing the images. The electromagnetic-wave radiation unit 102 is arranged, for example, such that the electromagnetic waves are radiated in a perpendicular manner onto a feeding surface in the feed unit 101, on which the inspection targets 2 are placed. The inspection area is covered with a shielding cover, if necessary, in order to prevent the electromagnetic waves radiated from the electromagnetic-wave radiation unit 102 from leaking outside.

The electromagnetic-wave detection unit 103 is arranged at a position facing the electromagnetic-wave radiation unit 102 across the feed unit 101. The electromagnetic-wave detection unit 103 includes a plurality of detection elements capable of detecting the electromagnetic waves radiated by the electromagnetic-wave radiation unit 102 and detects a spatial distribution of the electromagnetic waves that reach the electromagnetic-wave detection unit 103 through the inspection area. Examples of the electromagnetic-wave detection unit 103 include a line sensor, an area sensor, a TDI (Time Delay Integration) sensor, or the like.

When an inspection target 2 is present in the inspection area between the electromagnetic-wave radiation unit 102 and the electromagnetic-wave detection unit 103, the electromagnetic waves radiated from the electromagnetic-wave radiation unit 102 are attenuated in accordance with the transmissivity of such electromagnetic waves at the respective positions on the inspection target 2 and reach the electromagnetic-wave detection unit 103, and the internal state of the inspection target 2 is thereby observed as an electromagnetic-wave intensity contrast distribution detected by the electromagnetic-wave detection unit 103.

The image construction unit 104 constructs the electromagnetic-wave intensity contrast distribution detected by the electromagnetic-wave detection unit 103 as a two-dimensional image and stores data of such image in the memory unit 105. The memory unit 105 is configured by storage devices, such as a RAM, a hard disk, or the like.

The determination unit 106 applies the learned model that is previously generated by the machine learning execution unit 14 to the image of the inspection target 2 constructed by the image construction unit 104 to perform inspection (i.e., determination of non-defective and/or defective status) of the inspection target 2. The image construction unit 104 and the determination unit 106 may be configured as part of the control unit 11, which will be described later.

The display 16 is a display device such as a liquid crystal display and displays an operation screen of the inspection device 1 and various images. The operation interface 18 is input means such as a switch, a mouse, a keyboard, and the like, and receives an operation input made to the inspection device by a user.

The control unit 11 is responsible for controlling the respective components of the inspection device 1. The control unit 11 is configured by a computer configured by, for example, a CPU, a memory element, and the like. The control unit 11 includes the training data generation unit and the machine learning execution unit 14. The training-data generation unit 12 corresponds to the training data generation device of the present invention and the machine learning execution unit 14 corresponds to a learned model generation device of the present invention.

Figure 3:
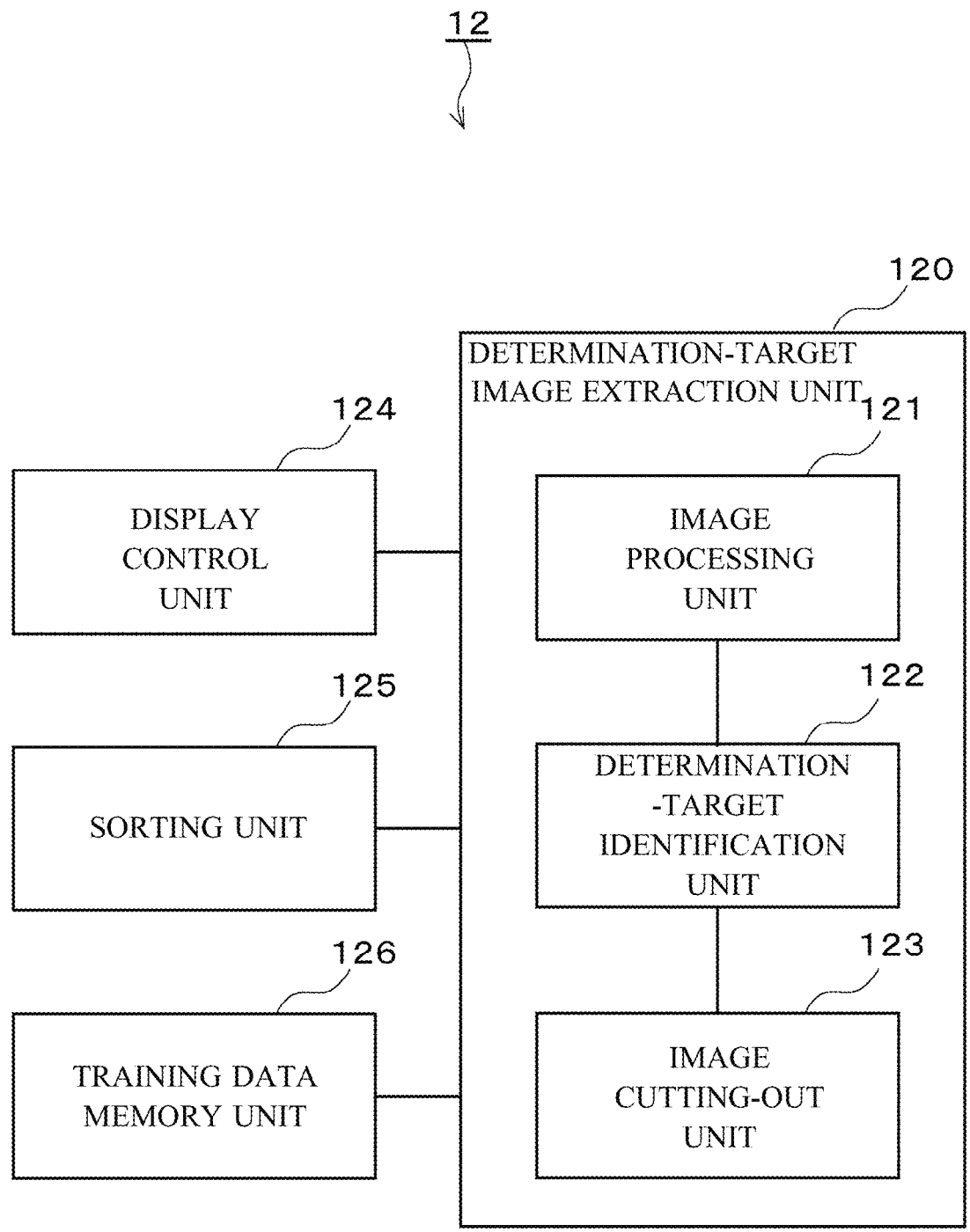
FIG. 3 is a block diagram showing a configuration of a training data generation unit 12.

In the learning mode of the inspection device 1, the training data generation unit 12 generates training data to be used in machine learning implemented in the machine learning execution unit 14. FIG. 3 is a block diagram showing a configuration of the training data generation unit 12. As shown in FIG. 3, the training data generation unit 12 includes an extraction unit 120 for extracting an image of a determination target, a display control unit 124, a sorting unit 125, and a memory unit 126 for storing training data.

The determination-target image extraction unit 120 extracts, from the input image in which the inspection target 2 is captured, one or more images of the determination target in which a candidate object to be detected as an object to be removed 2B is captured. As shown in FIG. 3, the determination-target image extraction unit 120 includes an image processing unit 121, an identification unit 122 for identifying a determination target, and an image cutting-out unit 123.

The image processing unit 121 performs image processing, such as filtering, on the input image and outputs a processed image. Examples of the image processing performed by the image processing unit 121 include processing for reducing noise by blurring images using an averaging filter, a Gaussian filter, or the like, and processing for, for example, enhancing edges using a feature extraction filter such as a differential filter (e.g., a Roberts filter, a Prewitt filter or a Sobel filter), a Laplacian filter, or the like.

Figure 4:
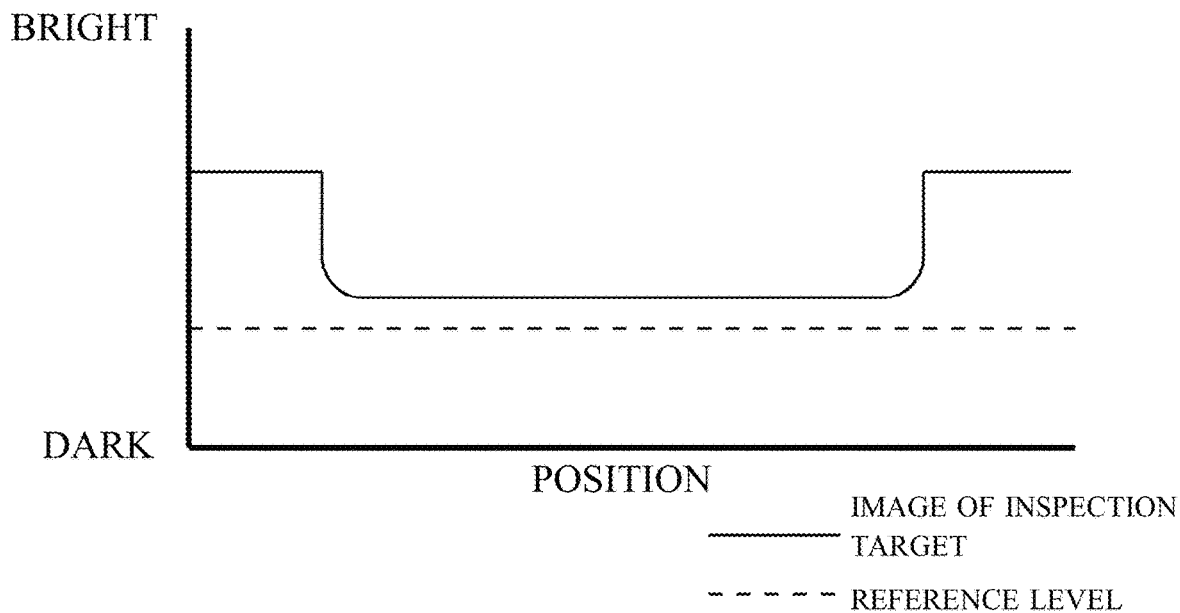
FIG. 4 is a diagram showing an example of a predetermined determination condition in a determination-target identification unit.
Figure 5:
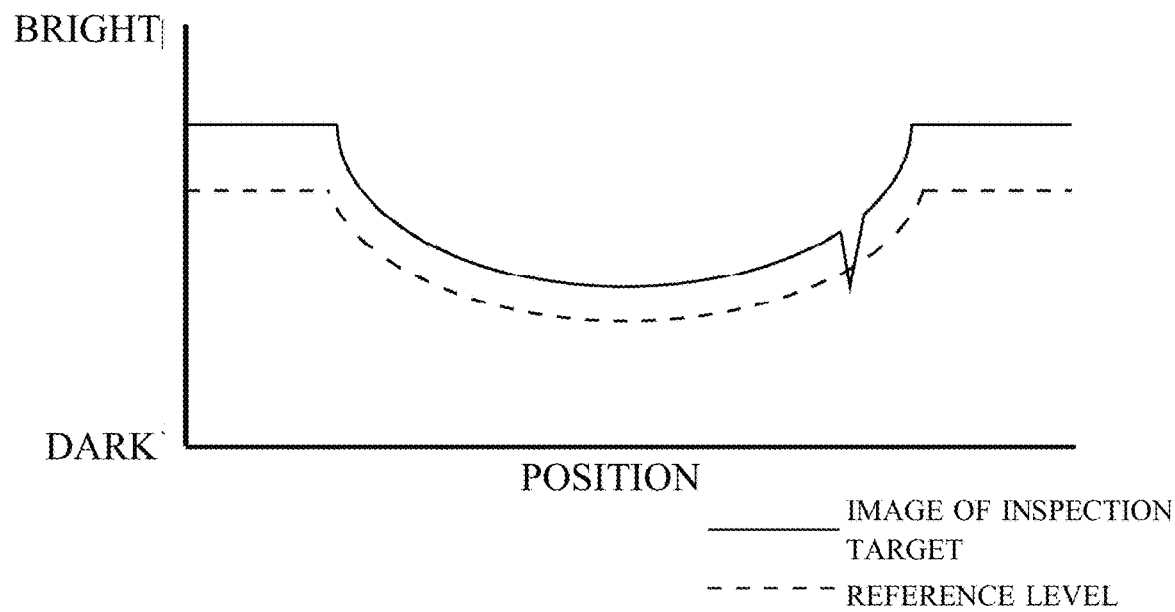
FIG. 5 is a diagram showing another example of a predetermined determination condition in the determination-target identification unit.

The determination-target identification unit 122 identifies a determination target contained in the processed image on the basis of a predetermined determination condition. Examples of the predetermined determination condition include the following: a method in which a reference level with constant brightness is set and a section that is darker (or brighter) than such reference level is defined as a determination target (FIG. 4); and a method in which a reference level is set where the reference level varies depending on the positions along a rough change in brightness in the image (nearly matching a change in thickness of the inspection target 2) and a section that is darker (or brighter) than such reference level is defined as a determination target (FIG. 5). The degree of separation of the reference level from the rough change in brightness may be set in accordance with the density or size of the assumed object to be removed 2B (foreign matter). In addition to the determination based on the brightness, conditions such as shapes, areas, etc. may be combined as needed depending on the objects to be removed 2B that are to be detected.

The types and conditions of the image processing (collectively referred to as the image processing conditions hereinafter) performed at the image processing unit 121 and the determination conditions in the determination-target identification unit 122 are selected in accordance with types of candidates of the objects to be removed 2B that are to be extracted from the input image. For example, for an inspection target 2 with a constant thickness, the determination conditions based on the reference level with constant brightness may be used, and for an inspection target 2 with a non-constant thickness, the reference level that varies along the rough change in brightness may be used.

The image cutting-out unit 123 cuts out an image that contains the determination target identified by the determination-target identification unit 122 from the processed image and outputs the same. As a specific example of the processing performed by the image cutting-out unit 123, the image cutting-out unit 123 may identify a minimum rectangle containing the determination target identified by the determination-target identification unit 122 and may output an image obtained by scaling the image in the minimum rectangle to a predetermined size as the determination-target image. Alternatively, a user may be enabled to set the cutting-out size (i.e. the number of pixels along the longitudinal and lateral sides of the rectangle) from a setting screen, etc., and the image cutting-out unit 123 may cut out the image containing the determination target based on the set cutting-out size and may scale the image to a predetermined size, and then output the same as the determination-target image. If an object that is larger than the set cutting-out size is contained in the determination targets identified by the determination-target identification unit 122, the image cutting-out unit 123 may reduce the image such that such determination target is contained in an area with the set size, and then cut out the image with the set cutting-out size. Images with the same size are suitable as training data for machine learning.

Figure 6:
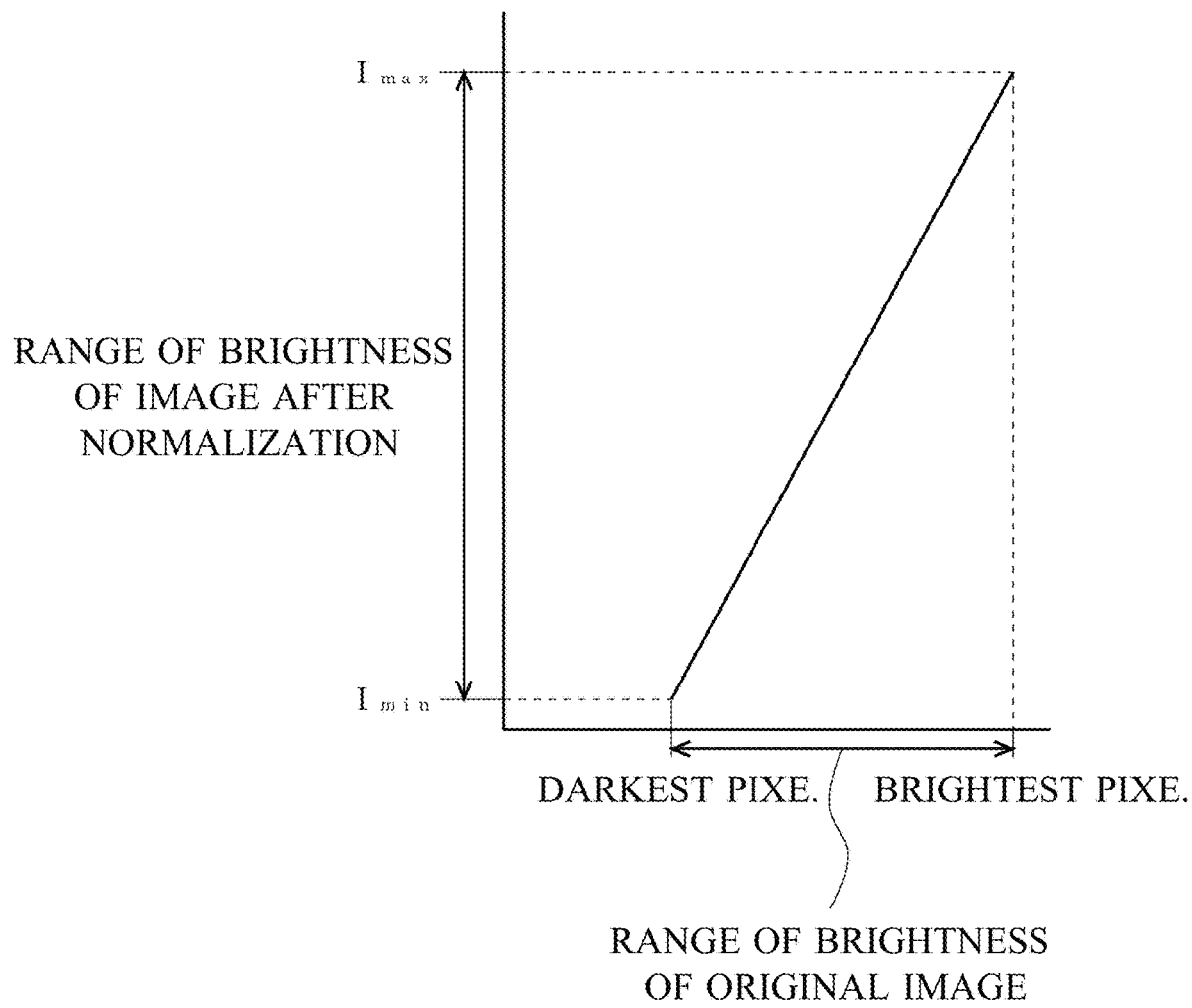
FIG. 6 is a graph showing an input/output relationship in normalizing the brightness of an image of the determination target.
Figure 7:
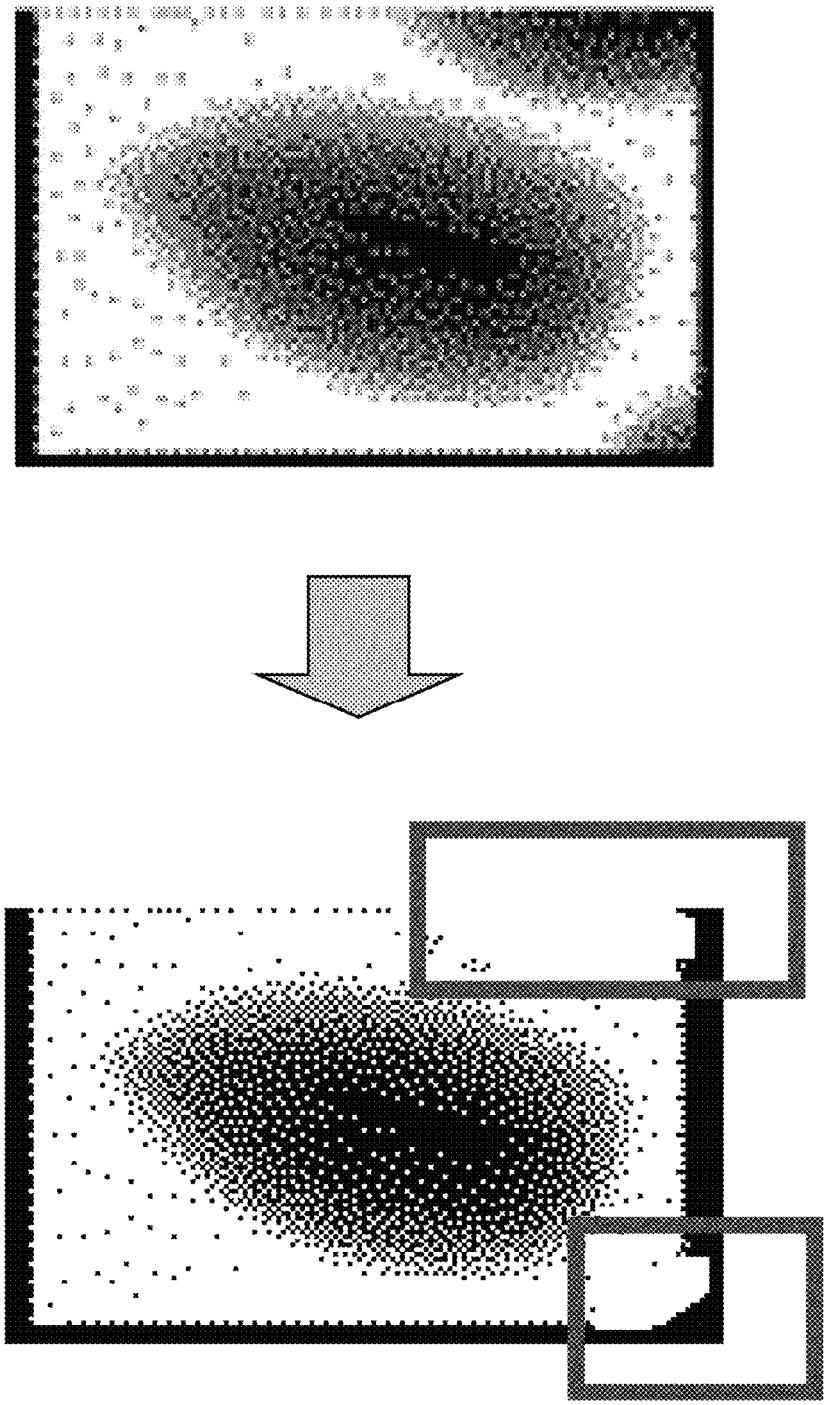
FIG. 7 shows diagrams illustrating processing for removing captured objects other than a determination target.

The image cutting-out unit 123 may further apply image processing to the image of the determination target. For example, the image cutting-out unit 123 may normalize the brightness of the image of the determination target and then output the image. In particular, as shown in FIG. 6, the image cutting-out unit 123 may perform normalization such that the brightness of the darkest pixel contained in the original image of the determination target is reduced to the maximum extent possible (i.e., to have the minimum brightness $I_{min}$) and the brightness of the brightest pixel is increased to the maximum extent possible (i.e., to have the maximum brightness $I_{max}$). This will allow each image of the determination target to become a contrasty image with the same brightness and to therefore be an image that is appropriate for machine learning. The method of normalization is not limited to the above-described method. In addition, the image cutting-out unit 123 may eliminate objects other than the determination target, which are captured in the image of the determination target. In particular, as shown in FIG. 7, the image cutting-out unit 123 may erase blobs (a "blob" is a lump of pixels having brightness less than or equal to a predetermined value (in a binary case, those having a value of zero) other than the largest blob in the original image of the determination target. This will prevent the objects other than the determination target, which are captured in the image, from influencing the determinations.

The display control unit 124 controls display on the display. The display control unit 124 may be shared with the components in the inspection device 1 other than the training data generation unit 12. The display control unit 124 causes the display 16 to selectively display the images of the determination target extracted by the determination-target image extraction unit 120. FIG. 8 shows a display example when displaying the images of the determination target on the display 16. The screen on which the determination targets are displayed includes an area R2 for displaying an input image, an area R1 for displaying images of the determination target and an area R3 for displaying information. In the determination-target image display area R1, the images of the determination target are displayed in sequence. In addition to the images of the determination target, the determination-target image display area R1 displays, for example, a user interface for sorting the respective images of the determination target in terms of pass/fail determination. The input-image display area R2 displays an input image. The information display area R3 displays information related to the selected image of the determination target (for example, the name of the image file, the location where the image file is stored).

When displaying an input image in the input-image display area R2, an indication of an area corresponding to the extracted image of the determination target (i.e., the minimum rectangle containing the determination target) may be superimposed and displayed on the input image. In particular, a frame representing the minimum rectangle containing the determination target may be superimposed and displayed on the input image. A user may selectively display/hide the indication of the area corresponding to the image of the determination target.

When displaying the images of the determination target in sequence in the determination-target image display area R1, the images may be sorted and displayed in accordance with scores obtained from the determinations made to the respective images with the existing learned model (a higher score (or lower score) means a determination result to the effect that there is a higher possibility that an inspected target is a normal product 2A).

In addition, as shown in FIGS. 9A and 9B, information indicating the determination results may be visibly displayed with respect to each image of the determination target displayed in sequence in the determination-target image display area R1. In particular, a score, a determination result (whether an inspected target is a normal product or an object to be removed), or the like, may be displayed at a position superimposing or adjacent to each image of the determination target. In addition, a display rendering may be applied to each image of determination target for indicating whether an inspected target is a normal product or an object to be removed. For example, the images may be framed with different colors depending on whether the inspected target is a normal product or an object to be removed.

One of the images of the determination target displayed in the determination-target image display area R1 may be selected by clicking on that image. When an image of the determination target is selected in the determination-target image display area R1, the selected image is framed and displayed in the determination-target image display area R1, and the minimum rectangle corresponding to the selected image is displayed in the input-image display area R2 in such a manner that this minimum rectangle can be distinguished from the other rectangles (for example, by being indicated in double-framing).

Conversely to the above, one of the minimum rectangles corresponding to the images of the determination target displayed in the input-image display area R2 may be clicked on and the image of the determination target corresponding to such minimum rectangle may be selected. In this way, when the clicking is performed in the input-image display area R2, the image of the determination target corresponding to the selected minimum rectangle is framed and displayed in the determination-target image display area R1, and the selected minimum rectangle is displayed in the input-image display area R2 in such a manner that this minimum rectangle can be distinguished from the other rectangles (for example, by being indicated in double-framing). In this way, by displaying the input image and the selected image of the determination target in association with each other, it is possible to understand, at a glance, how the selected image of the determination target is captured in the input image.

In addition, when an image of the determination target is selected, the section corresponding to the selected image of the determination target may be enlarged and displayed in the input-image display area R2. In this way, the section corresponding to the focused image of the determination target may be easily checked in detail. Further, the information display area R3 may display, as shown in FIGS. 10A and 10B, a score, a determination result (whether an inspected target is a normal product or an object to be removed), or the like, for the selected image of the determination target.

The sorting unit 125 sorts, regarding the cut-out image of the determination target, whether the inspection target 2 captured in the image of the determination target is a normal product 2A or an object to be removed 2B on the basis of the user's visual checking. The user sorts the results of the determination made on the inspection targets and then the sorting unit 125 sorts the images of the determination target that are selected in accordance with the user's sorting between the normal product 2A and the object to be removed 2B. Training data is then obtained in which the respective images of the determination target and the respective determination results are associated with each other. Such training data is stored in the training data memory unit 126. The sorting of the results of the determination made on the inspection targets is performed, for example, by the user: operating the operation interface 18, while looking at the display 16, to select the images of the determination target; visually determining whether the inspection target 2 captured in the selected images of the determination target is a normal product 2A or an object to be removed 2B; and clicking on a PASS button if the inspection target 2 is a normal product 2A, or clicking on a FAIL button if the inspection target 2 is an object to be removed 2B. Instead of the user selecting the images of the determination target, the images of the determination target may be sequentially sorted in the order automatically determined by the sorting unit 125.

The training data memory unit 126 is configured by a storage device, such as a RAM, a hard disk, or the like. The training data memory unit 126 may also serve as the memory unit 105 in the inspection unit 10. The training data may be stored in the training data memory unit 126 in any manner, as long as the inspection target 2 captured in the images of the determination target can be distinguished as to whether it is a normal product 2A or an object to be removed 2B. For example, the training data memory unit 126 may store the images of the determination target that are determined to indicate a normal product 2A and the images of the determination target that are determined to indicate an object to be removed 2B in folders that are different from each other. Alternatively, the training data memory unit 126 may embed in files, as a file name or additional information of the images of the determination target, information indicating that the inspection target 2 captured in the image of the determination target is either a normal product 2A or an object to be removed 2B. The training data memory unit 126 may be used by sharing a storage media of the inspection device 1 provided for storing various types of information.

The machine learning execution unit 14 executes a learning program for causing a learned model to execute machine learning. The machine learning execution unit 14 performs machine learning by inputting the training data, which is generated by the training data generation unit 12 and stored in the training data memory unit 126 as described above, into the learning program to generate the learned model. The machine learning execution unit 14 may newly perform machine learning to generate a new learned model, or may perform additional machine learning on the existing learned model to generate a new learned model. When generating a new learned model, machine learning may be performed on a preliminary prepared initial (yet-to-be learned) learned model. The machine learning execution unit 14 records the generated learned models in association with the following: the image processing conditions of the image processing unit 121 when generating the training data by the training data generation unit 12; the determination conditions of the determination-target identification unit 122; and the conditions for cutting out the images of the determination target of the image cutting-out unit 123.

Hereinafter, the operation of the inspection device 1 configured as described above will be described regarding both the learning mode and the inspection mode.

Operation in Learning Mode

Figure 11:
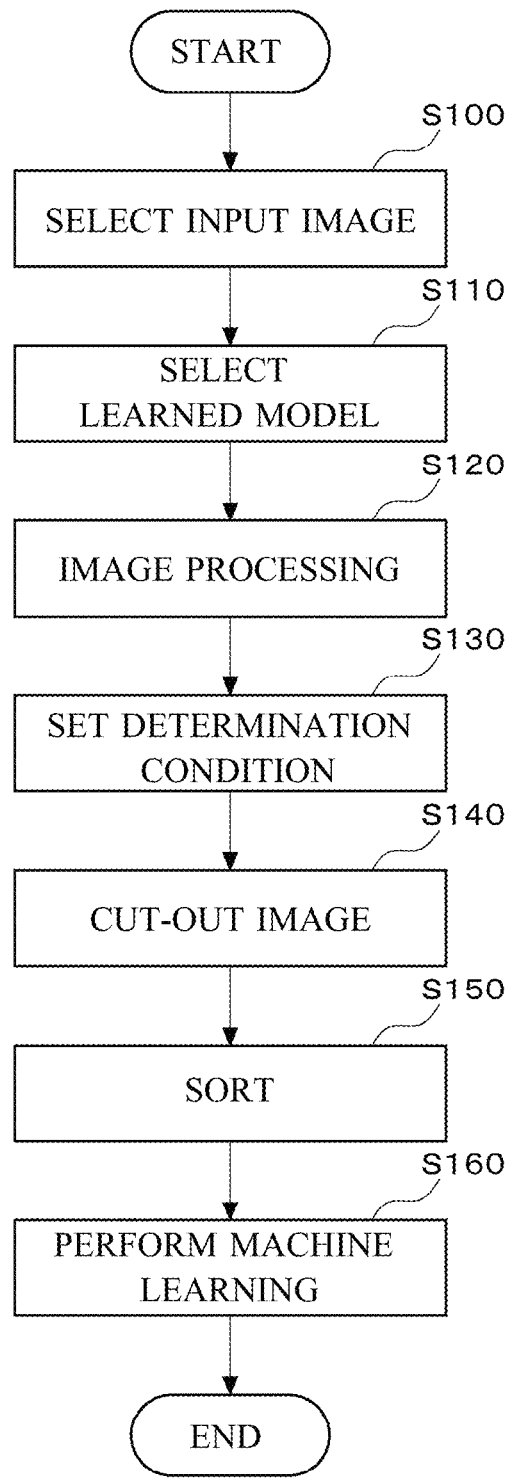
FIG. 11 is a flowchart for illustrating the operational procedure of the inspection device 1 in a learning mode.

FIG. 11 is a flowchart illustrating the operational procedure of the inspection device 1 in the learning mode. The learning mode starts by selecting the learning mode on the operation interface 18 of the inspection device 1. When the learning mode starts, an operation screen for the learning mode is displayed on the display 16. The user can generate the training data and perform machine learning on the learned model by operating the operation screen for the learning mode in accordance with the following procedure.

First, the training data generation unit 12 receives an operation instruction operated by the user for selecting an input image (step S100). The input image may be an image of the inspection target 2 that is actually captured in the inspection unit 10 or an image that is separately prepared for learning. Subsequently, the training data generation unit 12 receives an operation instruction operated by the user for selecting a learned model (step S110). Additional learning in the machine learning in the later stage will be performed on this learned model selected here. Step S110 may be omitted if a learned model is to be newly generated.

Subsequently, the training data generation unit 12 receives an operation instruction for selecting the image processing conditions and processes the images according to the selection (step S120). In particular, the image processing conditions are selected by the user selecting options for the image processing conditions displayed on the operation screen. At this time, for ease of checking, the training data generation unit 12 may display the result of applying the image processing with the selected image processing conditions to the input image on the display 16 as a preview image before finalizing the selection. When the selection is finalized, the image processing unit 121 processes the image according to the selected content to output a processed image.

Subsequently, the training data generation unit 12 receives an operation instruction for setting the determination conditions of the determination-target identification unit 122 and makes the determinations according to the setting (step S130). In particular, the determination conditions are set by the user selecting options for the determination conditions displayed on the operation screen. At this time, for ease of checking, the training data generation unit 12 may display the result of extracting candidate objects to be removed 2B with the selected determination conditions on the display 16 as a preview image, in which the extraction result is superimposed on the input image, before finalizing the selection. When the selection is finalized, the determination-target identification unit 122 makes the determinations (i.e., the extraction of the candidate objects to be removed 2B) according to the selected content.

Subsequently, the training data generation unit 12 receives the setting of the conditions for cutting out the images of the determination target in the image cutting-out unit 123 and cuts out of the images of the determination target according to the setting (step S140). In particular, the conditions for cutting out the images of the determination target are set by inputting desired settings to the setting items, such as the size of the image of the determination target, the necessity of normalization, and the like, that are displayed on the operation screen. When the settings for the cutting-out conditions are finalized, the image cutting-out unit 123 cuts out the images of the determination target according to the setting content. These images of the determination target cut out at this time are stored in a folder for the images of the determination target, which are yet to be sorted regarding whether the images indicate a normal product 2A or an object to be removed 2B.

It should be noted that if the learned model selected in step S110 is associated with the image processing conditions, the determination conditions and the cutting-out conditions, the training data generation unit 12 may omit steps S120 to S140 and perform the subsequent processing assuming that the image processing conditions, the determination conditions and the cutting-out conditions associated with the learned model are selected. In this way, additional machine learning can be performed with the same conditions as the machine learning performed in the past on the learned model, and the learned model can therefore be expected to have high precision.

Subsequently, the training data generation unit 12 receives an operation instruction for selecting regarding the sorting of each of the images of the determination target cut out in step S140 into either images indicating a normal product 2A or images indicating an object to be removed 2B, and records the training data in which the images of the determination target and the determination results are associated with each other according to the selection (step S150).

Subsequent to step S150, the machine learning execution unit 14 receives an instruction for executing machine learning based on the training data generated in step S150 and executes the learning program according to the instruction to perform machine learning on the learned model (step S160). At this time, the machine learning execution unit 14 displays, on the operation screen, an interface for allowing the user to select whether to perform additional machine learning on the existing learned model or to newly generate a learned model. If the additional machine learning is to be performed on the existing learned model, the user may be presented with a menu for selecting a learned model. However, the selection of a learned model in this step may be omitted, and instead the machine learning may be performed on the learned model selected in step S110. When the machine learning ends in step S160, the sequence of processing in the learning mode is then completed.

Operation in Inspection Mode

Figure 12:
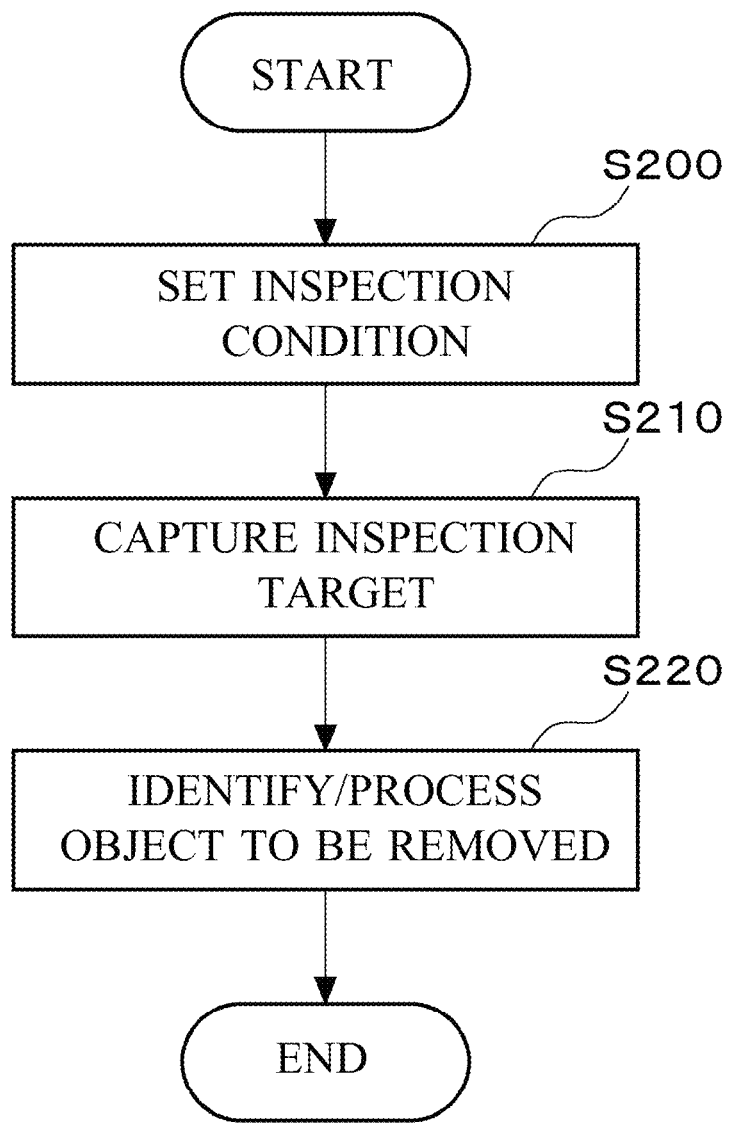
FIG. 12 is a flowchart for illustrating the operational procedure of the inspection device 1 in an inspection mode.

FIG. 12 is a flowchart illustrating the operational procedure of the inspection device 1 in the inspection mode. The inspection mode starts by selecting the inspection mode on the operation interface 18 of the inspection device 1. When the inspection mode starts, an operation screen for the inspection mode is displayed on the display 16. The user can inspect an inspection target 2 by operating the operation screen for the inspection mode in accordance with the following procedure.

First, the inspection device 1 receives an operation instruction operated by the user for setting the inspection conditions (step S200). The inspection conditions include selection of a learned model to be used in the determination of the object to be removed 2B, in addition to conditions for a general inspection device, such as an irradiation intensity of X-rays, visible light, etc. at the time of image capturing, a time of exposure, a feeding speed, etc.

When the setting of the inspection conditions is completed, the inspection unit 10 starts inspecting the inspection targets 2 according to predetermined operations performed by the user. Specifically, the inspection unit 10 conveys the inspection target 2 to an exposure location and captures an image (step S210), and then inputs the captured image into the learned model to determine whether or not an object to be removed 2B is contained in the image. In particular, the learned model outputs a numerical value (score) between zero and one with respect to each of the inspection targets 2 captured in the image. For example, the score may represent a determination result to the effect that the closer the score is to one, the higher the possibility is showing that the inspection target 2 is an object to be removed 2B. In the inspection unit 10, a predetermined threshold may be provided in relation to the scores output by the learned model, and the inspection targets 2 having scores equal to or greater than such threshold are determined to be objects to be removed 2B and these objects to be removed 2B are processed as necessary (step S220). Here, the necessary processing may include, for example, displaying of graphics (for example, a frame) on the display 16 for indicating an object to be removed 2B along with the captured image, removal of the object to be removed 2B, sorting between the object to be removed 2B and the normal product 2A, and the like. This completes the inspection of a batch of inspection targets 2. If the inspection targets 2 are fed into the inspection device 1 sequentially, the inspection device 1 inspects the inspection targets 2 sequentially by repeating the above-described sequence of steps.

The above-described configuration enables the inspection device 1 to rapidly generate, in the learning mode, a large amount of training data to be input into the learning program and to generate a learned model by performing machine learning using the generated training data as input. In the inspection mode, the inspection device 1 is enabled to perform a high-precision inspection using the learned model generated in the learning mode.

Variation of Embodiments

The embodiments of the present invention have been described above; however, the present invention is not limited to these examples.

For example, in the above-described embodiments, the training data generation unit 12 and the machine learning execution unit 14 are embedded in the inspection device 1; however, the training data generation unit 12 and the machine learning execution unit 14 may not need to be embedded in the inspection device 1 and may instead be provided as a separate training data generation device or a learned model generation device. For example, the training data generation unit 12 and the machine learning execution unit 14 may be implemented by executing a computer program for causing a computer to function as the training data generation unit 12 and the machine learning execution unit 14.

In addition, in the above-described embodiments, the determination-target image extraction unit 120 includes the image cutting-out unit 123, and the image cutting-out unit 123 cuts out and outputs an image containing the determination target from an input image; however, the determination-target image extraction unit 120 may instead perform processing without cutting out the image of the determination target. For example, a determination target contained in an input image may be identified in the determination-target identification unit 122 and the identified determination target may be labeled within the input image (so that the identified determination target may be distinguished within the input image without cutting out the identified determination target as a separate image). In this case, the sorting as to normal products or non-normal products may be made with respect to each determination target contained in the input image.

It should be noted that embodiments obtained by those skilled in the art appropriately performing addition, deletion and/or design change of components on the above-described respective embodiments and embodiments obtained by those skilled in the art appropriately combining the features of the respective embodiments are also encompassed in the scope of the present invention, provided that they include the gist of the present invention.

The invention claimed is:

1. A training data generation device generating training data to be used in machine learning, a learned model generated by the machine learning using the training data being used in an inspection device that performs inspection for determining whether or not an inspection target is a normal product by inputting an image capturing the inspection target into the learned model, the training data generation device comprising:
a feed unit configured to sequentially feed a plurality of inspection targets, including the inspection target, through an inspection area;
a detector configured to detect a spatial distribution of the electromagnetic waves that reach the detector through the inspection area, the detector including either a line sensor or a Time Delay Integration (TDI) sensor;
an image construction unit configured to construct electromagnetic-wave intensity contrast distribution as an image of the inspection target fed by the feed unit, while the feed unit sequentially feeds the plurality of inspection targets;

a determination-target image extraction unit configured to extract, from an input image capturing the inspection target, one or more determination-target images containing a determination target that satisfies a predetermined condition, using the image of the inspection target constructed by the image construction unit as the input image;

a sorting unit configured to associate, on the basis of a sorting operation of sorting the inspection target captured in the determination-target image into either a normal product or a non-normal product, each of the determination-target images and a result of the sorting with each other; and a training data memory unit configured to store training data in which each of the determination-target images and a result of the sorting are associated with each other, wherein the determination-target image extraction unit comprises:
   an image processing unit configured to perform image processing on the input image and outputs a processed image;
   a determination-target identification unit configured to identify the determination target contained in the processed image on the basis of a predetermined determination condition; and
   an image cutting-out unit configured to cut out and output, from the processed image, the determination-target image containing the determination target identified by the determination-target identification unit, and the image cutting-out unit is configured to
   identify a minimum rectangle containing the determination target identified by the determination-target identification unit, and
   output, as the determination-target image, an image obtained by scaling an image contained in the minimum rectangle to a predetermined size.

2. The training data generation device according to claim 1, wherein
the determination-target image extraction unit is configured to
   normalize the brightness of the determination-target image and
   output the determination-target image.

3. The training data generation device according to claim 1, wherein
the training data generation device further comprises:
   a display; and
   a display control unit configured to control display performed by the display, and wherein
the display control unit is configured to
   cause a first area of the display to display a plurality of the determination-target images in sequence and
   cause a second area of the display to display the input image with an indication of an area corresponding to the determination-target image being superimposed on the input image.

4. The training data generation device according to claim 3, wherein,
   in response to one of the plurality of determination-target images displayed in the first area of the display being selected, the display control unit is configured to cause an indication of an area corresponding to the selected determination-target image to be displayed in the input image displayed in the second area of the display.

5. A non-transitory computer-readable storage medium storing a computer program for causing a computer executing the computer program to be configured as a training data generation device for generating training data to be used in machine learning, a learned model generated by the machine learning using the training data being used in an inspection device that performs inspection for determining whether or not an inspection target is a normal product by inputting an image capturing the inspection target into the learned model, the training data generation device comprising:

a feed unit configured to sequentially feed a plurality of inspection targets, including the inspection target, through an inspection area;

a detector configured to detect a spatial distribution of the electromagnetic waves that reach the detector through the inspection area, the detector including either a line sensor or a Time Delay Integration (TDI) sensor;

an image construction unit configured to construct electromagnetic-wave intensity contrast distribution as an image of the inspection target fed by the feed unit, while the feed unit sequentially feeds the plurality of inspection targets;

a determination-target image extraction unit configured to extract, from an input image capturing the inspection target, one or more determination-target images containing a determination target that satisfies a predetermined condition, using the image of the inspection target constructed by the image construction unit as the input image;

a sorting unit configured to associate, on the basis of a sorting operation of sorting the inspection target captured in the determination-target image into either a normal product or a non-normal product, each of the determination-target images and a result of the sorting with each other; and a training data memory unit configured to store training data in which each of the determination-target images and a result of the sorting are associated with each other, wherein the determination-target image extraction unit comprises:
   an image processing unit configured to perform image processing on the input image and outputs a processed image;
   a determination-target identification unit configured to identify the determination target contained in the processed image on the basis of a predetermined determination condition; and
   an image cutting-out unit configured to cut out and output, from the processed image, the determination-target image containing the determination target identified by the determination-target identification unit, and the image cutting-out unit is configured to
   identify a minimum rectangle containing the determination target identified by the determination-target identification unit, and
   output, as the determination-target image, an image obtained by scaling an image contained in the minimum rectangle to a predetermined size.

* * * * *